United States Patent [19]
Kent et al.

[11] Patent Number: 5,835,976
[45] Date of Patent: Nov. 10, 1998

[54] NON PRESSURIZED METHOD FOR HEAT EXCHANGER INTERNAL LEAK DETECTION

[75] Inventors: Scott Edward Kent, Albion; Joseph Coccho, III, Lockport; Stephen Newton Murray, Burt, all of N.Y.

[73] Assignee: General Motors Corporation, Detroit, Mich.

[21] Appl. No.: 879,291

[22] Filed: Jun. 19, 1997

[51] Int. Cl.⁶ .................................................... G01M 3/20
[52] U.S. Cl. ............................................ 73/40.7; 73/49.7
[58] Field of Search .................................. 73/40.7, 49.7, 73/49.6

[56] References Cited

U.S. PATENT DOCUMENTS 5,375,457  12/1994  Trapp ...................................... 73/40.7

*Primary Examiner*—Michael Brock
*Attorney, Agent, or Firm*—Patrick M. Griffin

[57] ABSTRACT

A non pressurized internal separator leak test method is disclosed for a two pass condenser in which helium is injected below a vertical manifold tank separator, allowed to rise, and detected or not detected above the separator. The helium cannot reach the upper side of the separator other than through a separator leak path, because it will not flow sideways down the flow tubes.

3 Claims, 1 Drawing Sheet

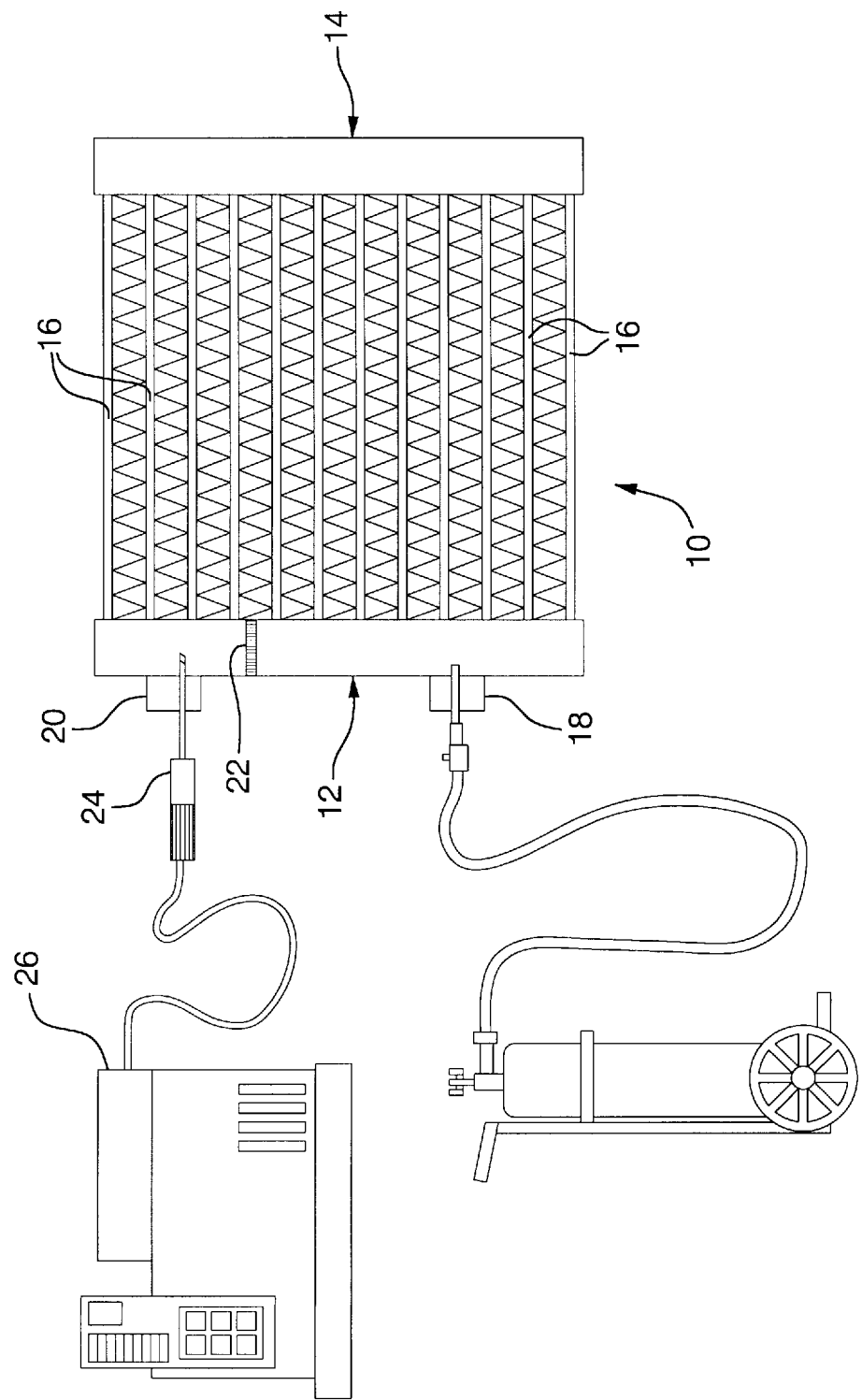

NON PRESSURIZED METHOD FOR HEAT EXCHANGER INTERNAL LEAK DETECTION

TECHNICAL FIELD

This invention relates to heat exchanger leak detection methods in general, and specifically to a non pressurized method for detecting a leak across an internal heat exchanger manifold tank separator.

BACKGROUND OF THE INVENTION

Heat exchangers of the parallel flow type, such as automotive radiators and condensers, generally have two parallel manifold tanks with a plurality of flow tubes running from tank to tank, perpendicular thereto. They may be designed with a single pass fluid flow scheme, meaning that coolant or refrigerant is simply inlet into one tank, flows horizontally across all tubes simultaneously, and is extracted from the other tank. More often, however, it is desirable to multipass the flow, so as to raise flow velocity and improve the heat transfer performance. For example, in a two pass condenser, one tank is divided approximately in half by an internal flow separator. A refrigerant inlet enters the one tank on one side of the separator, and an outlet exits the one tank on the other side of the separator. Refrigerant flows through the inlet, for example, below the separator, and flow across only those flow tubes that open through the tank below the separator. The first pass flow enters the opposite, return tank, turns around and flows back in a second pass through the remaining tubes and into the upper half of the first tank, above the separator. Ultimately, refrigerant exits the outlet.

Separators are physically installed inside the one manifold tank, either by being rammed down along the length of the tank, in the case of small diameter tanks, or are sandwiched between a slotted tube header plate and a trough shaped tank base. Often, the edges of the separator, whether round or other shape, sit in an internal groove. Then, when the entire heat exchanger core is brazed, melted brazed material is drawn into the internal groove and continuously around the edge of the separator to make a, hopefully, continuous, fluid tight braze seam around the edge of the separator. If the braze seam should be imperfect, it is possible for some portion of the fluid to flow directly from the tank inlet to tank outlet, across the leaking separator, bypassing the flow tubes. This would not be a serious problem in a low pressure heat exchanger, like a radiator, but could significantly affect the performance and thermal efficiency of a high pressure, two pass condenser.

There is no known, practical, high volume method to test for the presence of internal separator leaks. It is relatively simple to test for the presence of external leaks. The heat exchanger is simply pressurized with any test medium, liquid or gaseous, to see whether any external leak of that medium occurs at any seam or point. It is also known to perform a similar external leak test by running a liquid through the heat exchanger which has a test gas entrained in it. The gas will exit small external leaks that the liquid might not. However, it is a very different matter to detect an internal leak, that is, a bypassing flow across an internal separator. Serious leaks can be detected by simply testing the heat exchanger's performance. If it tests poorly, and there are no external leaks, then it is safe to assume that there is an internal leak. Of course, such actual performance testing is costly and time consuming, and may not show up minor leaks that do not significantly affect performance. While minor leaks can be tolerated, it will still be very useful to those monitoring the manufacturing process to know whether they are occurring, as more serious internal leaks could arise later in the production run. It is also known to drip low pressure water down into the tank and on top of the separator, to see whether it drains through. This, too, is time consuming and inefficient, and water is not the best medium to introduce into a refrigerant condenser.

SUMMARY OF THE INVENTION

The invention provides a quick, efficient, low cost and non pressurized method for detecting internal separator leaks in a heat exchanger such as a two pass condenser.

In the preferred embodiment of the method disclosed, the condenser is oriented with the inlet and outlet tank oriented vertically. As such, the flow tubes are naturally oriented horizontally. An opening through the tank wall exists both above and below the separator, where the refrigerant inlet and outlet fittings will be ultimately attached. Therefore, the tank and the separator are both exposed simply to ambient air, at ambient pressure. A test gas, such as helium, is introduced through one tank opening, below the separator. Being lighter, the test gas rises, ultimately collecting below the separator. The rising test gas has no tendency to flow sideways into the openings of the horizontally oriented flow tubes. A test probe is inserted into the other tank opening, above the separator. If, and only if, there is an open leak path around or through the separator, then the presence of leaked test gas will be detected above the separator. Test gas will not have flowed to the upper side of the separator through the refrigerant flow tubes.

BRIEF DESCRIPTION OF THE DRAWINGS

These and other objects of the invention will appear from the following written description, and from the drawings, which schematically illustrates a two pass condenser in the process of being leak tested by the method of the invention.

DESCRIPTION OF THE PREFERRED EMBODIMENT

Referring to the drawing, a heat exchanger in the form of a two pass condenser is indicated generally at 10. It has two manifold tanks, indicated at 12 and 14 generally, which are bridged by a plurality of flow tubes 16, the ends of which open through the side walls of both tanks 12 and 14. One tank, 14, is simply a return tank. The other tank, 12, has a first, lower opening 18 and a second, upper opening 20. The openings 18 and 20 will ultimately have a refrigerant inlet and outlet fitting installed therein, but, at this point, they are simple openings. Installed in tank 12, between the two openings 18 and 20, is a separator 22, which may or may not be brazed leak free to the inner surface of tank 12.

To determine whether separator 22 is leak free, the condenser 10 is oriented as shown, held with the tanks 12 and 14 substantially vertical and the tubes 16 substantially horizontal. Or, the tubes 16 could be tipped down slightly, so that all the tube ends entering tank 12 were a bit higher than those entering return tank 14. The interior of tank 12, and separator 22, are simply exposed to ambient air at ambient pressure. Next, a light density test gas, helium in this case, is injected into lower opening 18, and it naturally rises, displacing air, to collect below separator 22. The helium will not flow sideways down the tubes 16 to reach the return tank 14. The slight tipping refereed to above could help assure this lack of sideways helium flow into return tank 14. A helium sensor probe 24 is inserted into upper tank opening 20. Should there be, and only if there should be, a leak path through separator 22, probe 24 will detect helium presence. The worse the leak, the more quickly it will be detected, but if there is no leak, it will not be detected at all. A suitable readout device 26 indicates what, if anything, probe 24 has detected.

Therefore, no pressure or expensive, slow, invasive testing is needed. It would be possible, also, to inject a heavier gas above separator 22, and detect its presence or absence below separator 22 after it sank. The same advantages would be gained.

We claim:

1. A non pressurized method for detecting the presence of potential leak paths across an internal separator located in a generally straight tubular structure, comprising the steps of:

orienting said tubular structure in a substantially vertical orientation with both sides of said separator exposed to ambient air at ambient pressure;

placing a test gas detector on a first side of said separator;

injecting a test gas on the other side of said separator whose density relative to ambient air will cause it to displace the ambient air and move toward said separator; and detecting whether said test gas appears on the first side of said separator.

2. A non pressurized method for detecting the presence of potential leak paths across an internal separator located in a generally straight tubular structure, comprising the steps of:

orienting said tubular structure in a substantially vertical orientation with both sides of said separator exposed to ambient air at ambient pressure;

placing a test gas detector above said separator;

injecting a test gas below said separator whose density is sufficiently less than ambient to cause it to rise and displace the ambient air and collect below said separator; and detecting whether said test gas appears above said separator.

3. A non pressurized method for detecting the presence of potential leak paths across an internal separator located in a manifold tank of a heat exchanger of the type having flow tubes opening through the side of said tank, generally perpendicular to said tank, and also having external openings in said tank above and below said separator, comprising the steps of:

orienting said heat exchanger so that said manifold tank is substantially vertical and said flow tubes are substantially horizontal, with said tank open to ambient air and pressure on both sides of separator;

placing a tests gas detector through one tank external opening above said separator;

injecting a test gas through the other external tank opening below said separator whose density is sufficiently less than ambient to cause it to rise and displace the ambient air and collect below said separator; and detecting whether said test gas appears above said separator.

\* \* \* \* \*